(12) United States Patent
Sawdy

(10) Patent No.: US 9,878,639 B2
(45) Date of Patent: Jan. 30, 2018

(54) ADAPTABLE VEHICLE SEAT FITTING

(71) Applicant: NMI Safety Systems Limited, London (GB)

(72) Inventor: Michael Barry Sawdy, Hertford (GB)

(73) Assignee: NMI SAFETY SYSTEMS LIMITED, London (GB)

( * ) Notice: Subject to any disclaimer, the term of this patent is extended or adjusted under 35 U.S.C. 154(b) by 0 days.

(21) Appl. No.: 15/168,577

(22) Filed: May 31, 2016

(65) Prior Publication Data

US 2016/0347208 A1 Dec. 1, 2016

(30) Foreign Application Priority Data

Jun. 1, 2015 (GB) .................................. 1509451.9
Jun. 2, 2015 (GB) .................................. 1509477.4

(51) Int. Cl.
*B60N 2/08* (2006.01)
*B60N 2/07* (2006.01)
*B60N 2/015* (2006.01)

(52) U.S. Cl.
CPC ....... *B60N 2/0722* (2013.01); *B60N 2/01525* (2013.01); *B60N 2/01575* (2013.01); *B60N 2/0727* (2013.01); *B60N 2/0806* (2013.01); *B60N 2/0875* (2013.01); *B60N 2/0862* (2013.01)

(58) Field of Classification Search
USPC ............. 248/424, 429, 423, 420; 296/65.01, 296/65.11, 65.13, 65.02, 68.1
See application file for complete search history.

(56) References Cited

U.S. PATENT DOCUMENTS

| 6,299,230 | B1 | 10/2001 | Oettl | |
|---|---|---|---|---|
| 7,975,979 | B2 * | 7/2011 | Bishop | B60P 7/0815 244/118.6 |
| 8,528,860 | B2 * | 9/2013 | Vanderwolk | B64D 11/0696 244/118.5 |
| 8,821,089 | B2 * | 9/2014 | Hearn | B60N 2/01508 410/105 |

(Continued)

FOREIGN PATENT DOCUMENTS

| EP | 0723889 A1 | 7/1996 |
|---|---|---|
| EP | 1034969 A2 | 9/2000 |

(Continued)

OTHER PUBLICATIONS

Search Report in Application GB1509477.4, United Kingdom Intellectual Property Office, dated Nov. 18, 2015, 5 pages, Newport, South Wales, United Kingdom.

*Primary Examiner* — Alfred J Wujciak
(74) *Attorney, Agent, or Firm* — Lane Powell PC

(57) ABSTRACT

A seat support for use with a vehicle seat and configured to engage a track on the floor of the vehicle. The track including two inwardly-directed lips on opposed sides of a slot, the lips providing first alternating protrusions, a spacing distance apart, and recesses along the length of the track. The seat support having an elongate main body and including an interface portion having second alternating protrusions and recesses. The second protrusions are spaced apart by the same spacing distance as the first protrusions. The seat support includes first and second bracing members and a locking arrangement. The locking arrangement configured to restrain the longitudinal movement of the seat support when engaged.

20 Claims, 7 Drawing Sheets

(56) References Cited

U.S. PATENT DOCUMENTS

2007/0253762 A1    11/2007  Hudson
2012/0235011 A1*    9/2012  Roy ................... B64D 11/0696
                                                         248/503.1
2015/0041608 A1*    2/2015  Sawdy ................ B60N 2/0722
                                                         248/429

FOREIGN PATENT DOCUMENTS

| EP | 2353926 A1 | 8/2011 |
| EP | 2527191 | 11/2012 |
| EP | 2602190 A2 | 6/2013 |
| GB | 2517149 | 2/2015 |
| WO | 2008113610 | 9/2008 |
| WO | 2010/097408 A2 | 9/2010 |

* cited by examiner

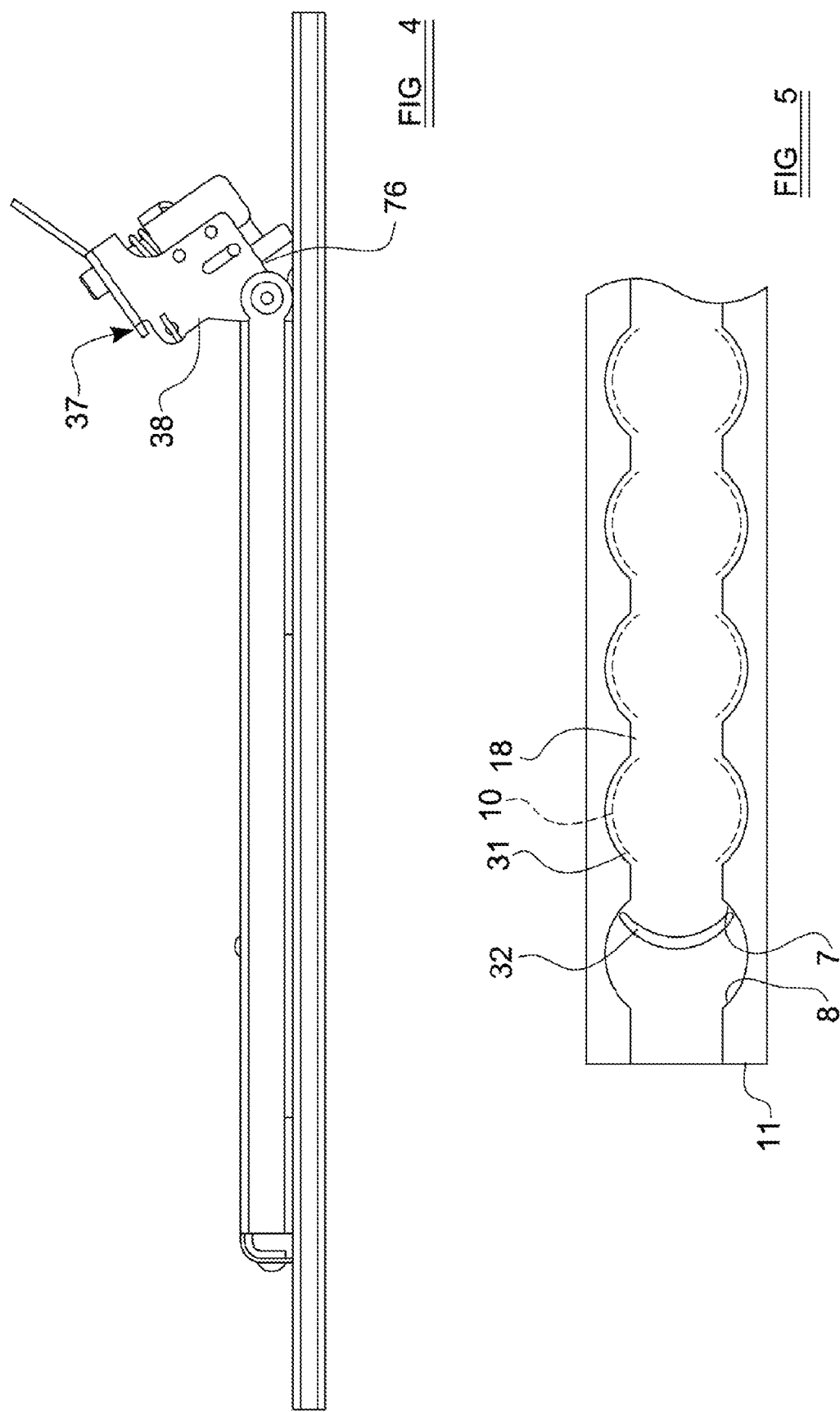

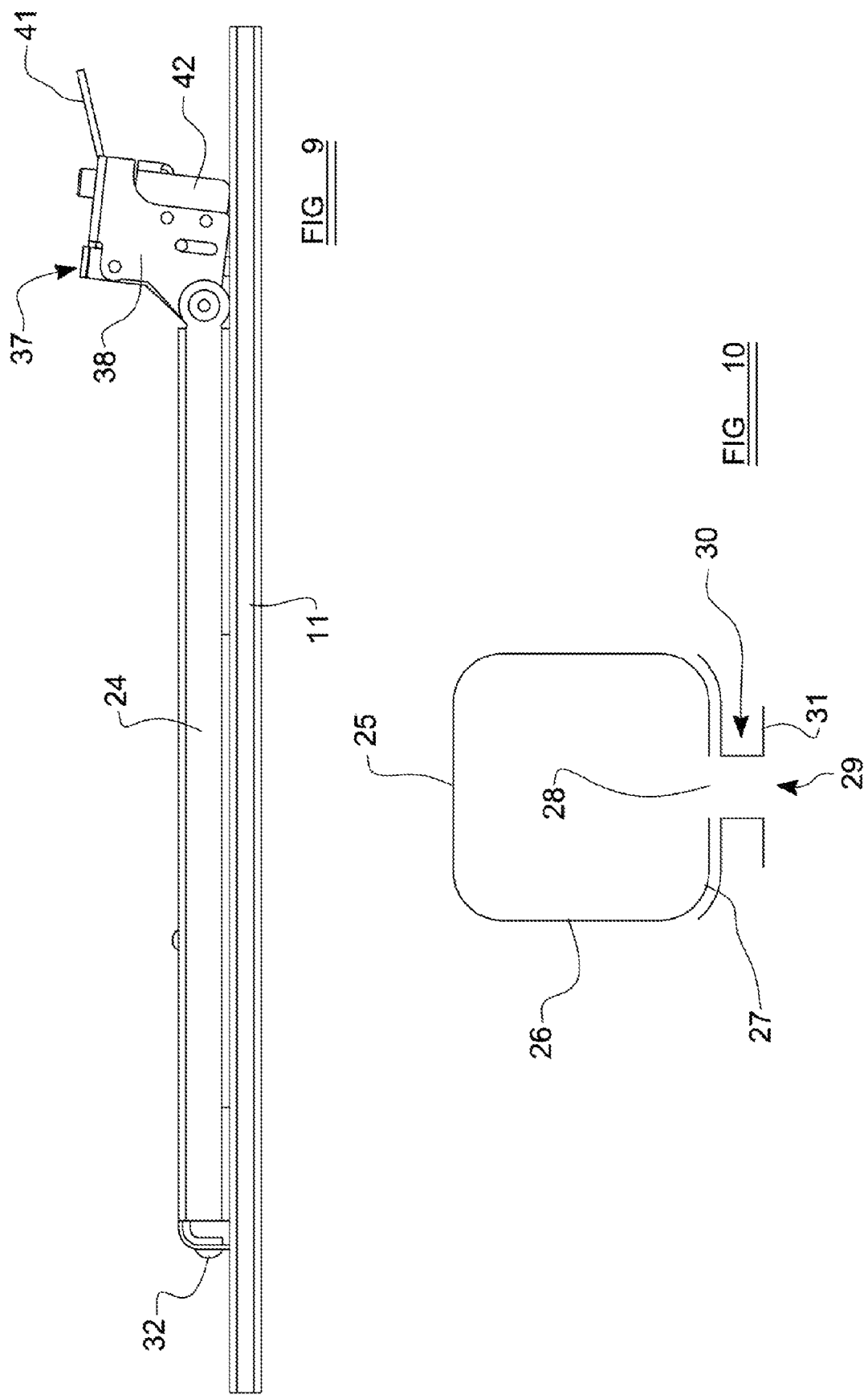

ADAPTABLE VEHICLE SEAT FITTING

CROSS-REFERENCE TO RELATED APPLICATION

This application claims priority to co-pending United Kingdom Patent Application Nos. 1509451.9, filed Jun. 1, 2015 and 1509477.4, filed Jun. 2, 2015, both of which are herein incorporated by reference in their entirety.

FIELD OF THE INVENTION

The present invention relates to a seat support, and more specifically relates to a seat support suitable for use in a vehicle such as a motor vehicle.

BACKGROUND

It has been proposed previously to provide seats in a motor vehicle that are mounted in position on rails, or which are adapted to engage a track on the floor of a vehicle and lockable in place by way of a pair of spaced apart plates which may be moved apart to bias the plates in a locking position, as set out in EP1034969.

US2012/0235011 discloses a type of fitting in which studs protrude from the underside of a main body, and may be retracted towards the main body to grip a part of the track. A plunger may then be pushed down into the track through one of the recesses to brace the fitting against longitudinal movement.

However, previously proposed seat mounting systems are relatively complex and require adjustments to be usable in different vehicle types, and are not always capable of being 'universal'.

FIG. 1 shows a previously disclosed seat support which is adapted to be used with a floor track 1 taking the form of an undercut slot 2, with inward-facing opposing lips 3, 4, as shown schematically in FIG. 1. The lips 3, 4 each have spaced-apart recesses 5 which are curved in shape, and the recesses 5 in the lips 3, 4 are aligned with each other. Protrusions 6 are formed between adjacent recesses 5, and each protrusion 6 forms two shoulders 7, 8, one 7 of which faces in the "forwards" direction (i.e. the normal direction of travel of the vehicle), and the other 8 of which faces in the opposite "backwards" direction.

The seat support of FIG. 1 includes first and second locking portions 9, 10, which are also shown schematically in FIG. 1. When the support is installed and in the locked position, the first locking portion 9 (which is positioned at the front of the support) is braced against a forward-facing pair of shoulders 7, and the second locking portion 10 (which is positioned at the rear of the support) is braced against a rearward-facing pair of shoulders 8. The support is therefore locked longitudinally in place with respect to these shoulders 7, 8, and cannot move forwards or backwards along the track 1.

However, if the second locking portion 10 is not properly locked in place (for instance, because the support has been installed by an inexperienced operator), there is a possibility of failure in the event of a head-on collision. In particular, if the second locking portion 10 does not provide adequate resistance, then in the event of a head-on collision the entire support will tend to move in the forward direction with respect to the track 1. The first locking portion 9 has, as can be seen in FIG. 1, clear space in front of it, and it can slide forward (along with the rest of the support) until it reaches the next pair of rear-facing shoulders 8. This movement is undesirable, but the reader will also understand that if the support slides forwardly so that the first locking portion contacts the rear-facing shoulders, the support will have moved from the "locked" position into a position in which the support may be lifted freely from the track.

The present invention seeks to provide an improved seat support that is more resistant to failure in a crash situation, particularly where the device may have been installed by an inexperienced operator.

SUMMARY OF THE INVENTION

Accordingly, the present invention provides a seat support for use with a vehicle seat and adapted to engage a track provided on the floor of a vehicle, the track comprising two inwardly-directed lips on opposed sides of a slot, the lips providing first alternating protrusions and recesses along the length of the track, the protrusions being spaced apart by a spacing distance, the first protrusions defining shoulder surfaces on each side thereof, the seat support having an elongate main body and comprising: an interface portion having a profile comprising second alternating protrusions and recesses, the protrusions being spaced apart by the same spacing distance; first and second bracing members; and a locking arrangement, wherein: the seat support is configured such that the second protrusions may be aligned with the first recesses so that the interface portion may be placed within the slot in an engagement position, the seat support being moveable with respect to the slot, from the engagement position into a bracing position in which the first and second protrusions are substantially aligned, preventing the interface portion from being removed from the slot; the first bracing member is substantially fixed in place with respect to the main body of the seat support, so that in both the engagement position and the bracing position the first bracing member is received in one of the recesses of the track; the locking arrangement is movable between a release configuration and a locking configuration, wherein in the release configuration the locking arrangement allows longitudinal movement of the seat support with respect to the track, and in the locking configuration the locking arrangement exerts a clamping force on a part of the track, to lock the seat support in place longitudinally with respect to the track; and when the seat support is in the engagement position and the locking arrangement is in the locking configuration, the first and second bracing members are received in respective recesses of the track and are braced against respective first and second pairs of shoulders on the track, wherein the first and second pairs of shoulders face in substantially the same direction.

Advantageously, the track defines a first longitudinal direction and a second substantially opposite longitudinal direction; the first and second pairs of shoulders face in the second direction; and in the bracing position, the bracing of the first and second bracing members against the first and second pairs of shoulders prevents longitudinal movement of the seat support with respect to the track in the first direction.

Preferably, the locking arrangement comprises a first clamping member which, in the locking configuration, is biased against an upper surface of the track.

Conveniently, the seat support further comprises a spring which is located above the first clamping member to bias the first clamping member towards the upper surface of the track.

Advantageously, the seat support further comprises an operating member which a user may operate to drive the first clamping member against the upper surface of the track.

Preferably, the operating member is a lever which is pivotable with respect to the main body.

Conveniently, the spring is located between the operating member and the first clamping member.

Advantageously, when the locking arrangement is in the locking configuration, at least one protrusion of the interface portion is pressed against the underside of at least one of the lips of the track.

Preferably, the seat support further comprises a catch arrangement to retain the locking arrangement in the locking configuration.

Conveniently, the catch arrangement comprises a catch element which, in a retaining position, bears against a further part of the seat support to prevent the locking arrangement from moving from the locking configuration to the release configuration.

Advantageously, the locking arrangement is moved from the release configuration to the locking configuration, the catch member moves automatically into the retaining position.

Conveniently, the first bracing member comprises a surface against which the first pair of shoulders may bear.

Advantageously, the second bracing member comprises a surface against which the second pair of shoulders may bear.

Preferably, the second bracing member is substantially fixed in place with respect to the main body of the seat support.

Conveniently, when the seat support is placed on the track in the engagement position and then moved longitudinally with respect to the track, the first bracing portion contacts a pair of shoulders of the track and acts as a stop, so that the seat support is in the bracing position.

Advantageously, when the seat support is in the bracing position, the first and second recesses overlap.

Preferably, when the seat support is in the locking position, the first and second recesses are generally aligned.

Conveniently, the track is installed in a vehicle which has a normal forward direction of travel, and the track comprises forward-facing shoulders and rearward-facing shoulders, and wherein, in the bracing position, both the first and second bracing elements are braced against respective pairs of rearward-facing shoulders.

Another aspect of the present invention provides a seat support according to any of the above in combination with a track which comprises: two inwardly-directed lips on opposed sides of a slot, the lips providing first alternating protrusions and recesses along the length of the track, the protrusions being spaced apart by a spacing distance, the first and second protrusions defining shoulder surfaces on each side thereof.

A further aspect of the present invention provides a seat including any embodiments of the disclosed seat supports.

BRIEF DESCRIPTION OF THE DRAWINGS

FIGS. 4 and 5 show the seat support of FIG. 3 in an engagement position.

FIGS. 8 and 9 shows an engagement position of the seat support of FIG. 3.

FIG. 10 shows an end-on view of the seat support of FIG. 3.

DETAILED DESCRIPTION

Figure 1:
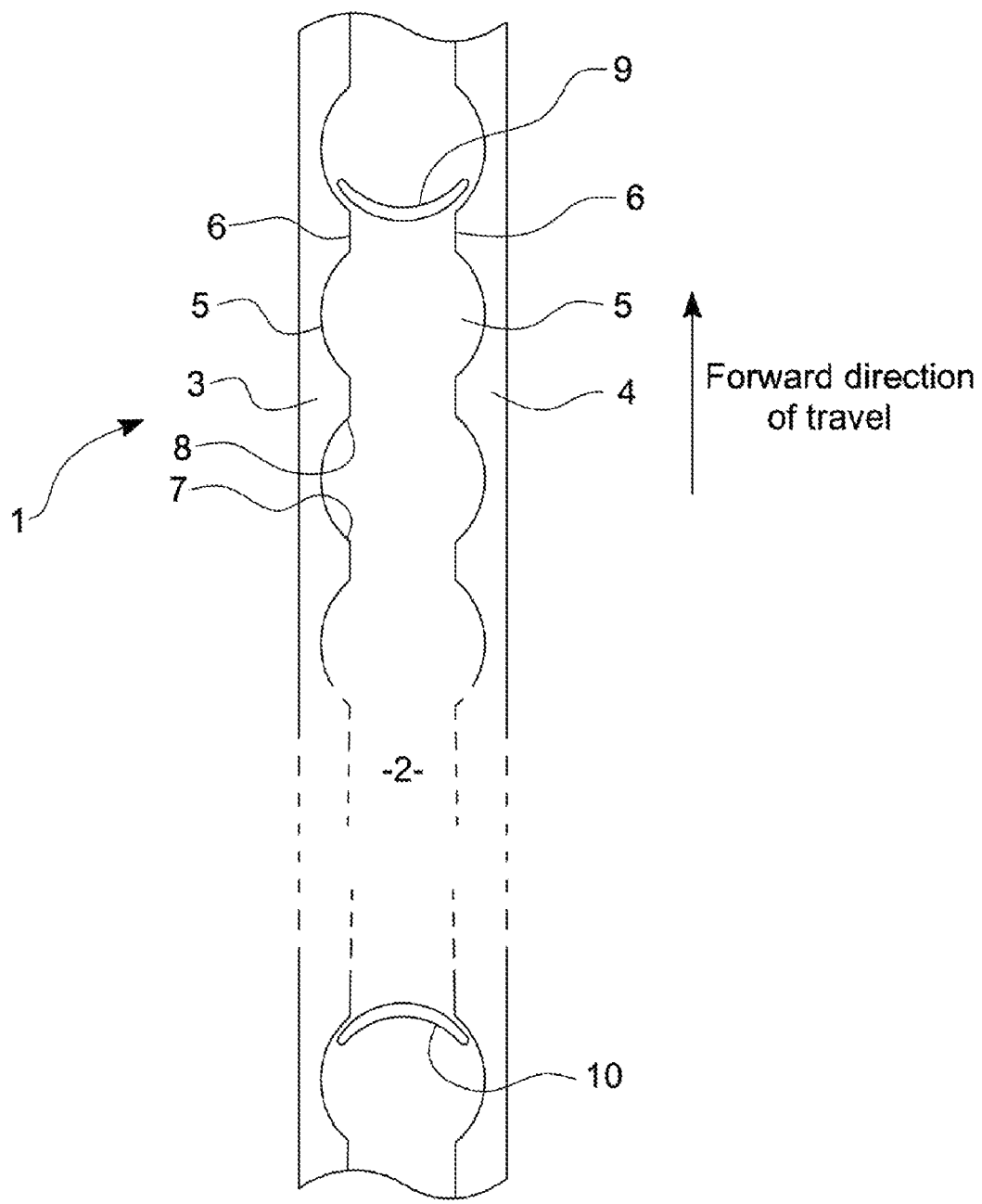
FIG. 1 shows a prior art arrangement of a track and retention elements therein.
Figure 2:
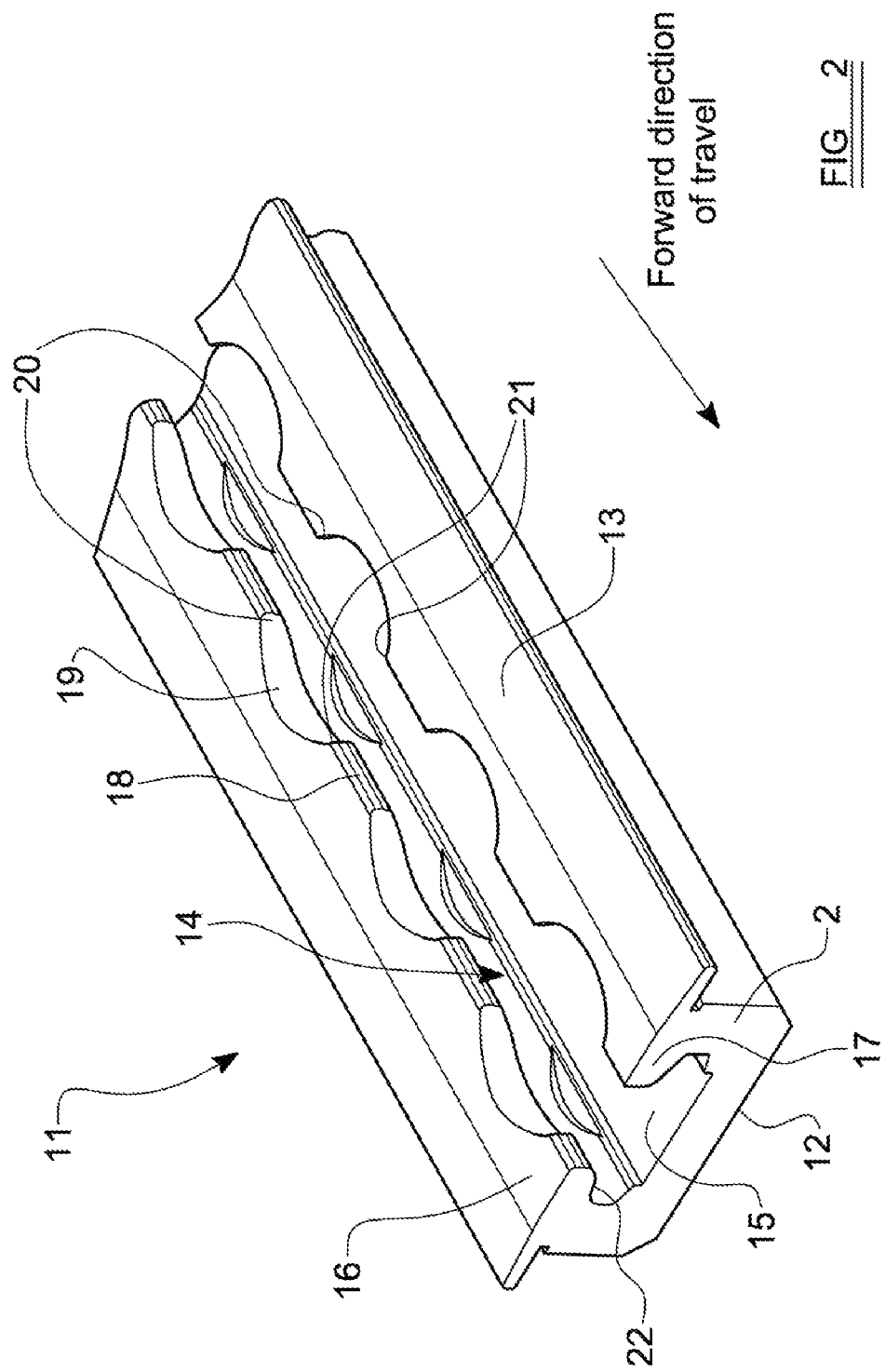
FIG. 2 shows a track suitable for use with the present invention.

Referring initially to FIG. 2, a track 11 adapted to be mounted in the floor of a motor vehicle is shown, and this track is the same as that discussed above in relation to FIG. 1. The track 11 preferably comprises an extrusion of an appropriate material, such as steel. The track 11 defines a planar under surface 12 adapted to be secured to the floor of a vehicle (not shown) and an upper surface 13 which may be substantially flush with the floor of the vehicle. A central slot 14 is provided in the track 11 which communicates with an under-cut channel 15. The track 11 thus prevents two inwardly directed lips 16, 17 on either side of the slot 14.

Each of the inwardly directed lips 16, 17 includes a series of first alternating protrusions 18 and recesses 19 along the length of the track 11. These protrusions 18 and recesses 19 can have a rounded profile, as shown in FIG. 2, or have a more square or angular profile, depending upon the application or vehicle being used. The protrusions 18 and recesses 19 on the two lips 16, 17 are substantially aligned with each other.

The first protrusions 18 define, as discussed above, shoulder surfaces on each side thereof, and the profile of the shoulder surfaces will depend upon the profile of the protrusions 18 and recesses 19. Each recess 19 defines a forward-facing shoulder 20 and a rear-facing shoulder 21.

Additionally, the underside of each of the first protrusions 18 may provide a bearing surface on 22 its inner face. The bearing surface 22 may extend to the entire surface of the undersides of each of the lips 16, 17. The area of the bearing surface 22 will depend upon the application, vehicle or track 1 being used.

Figure 3:
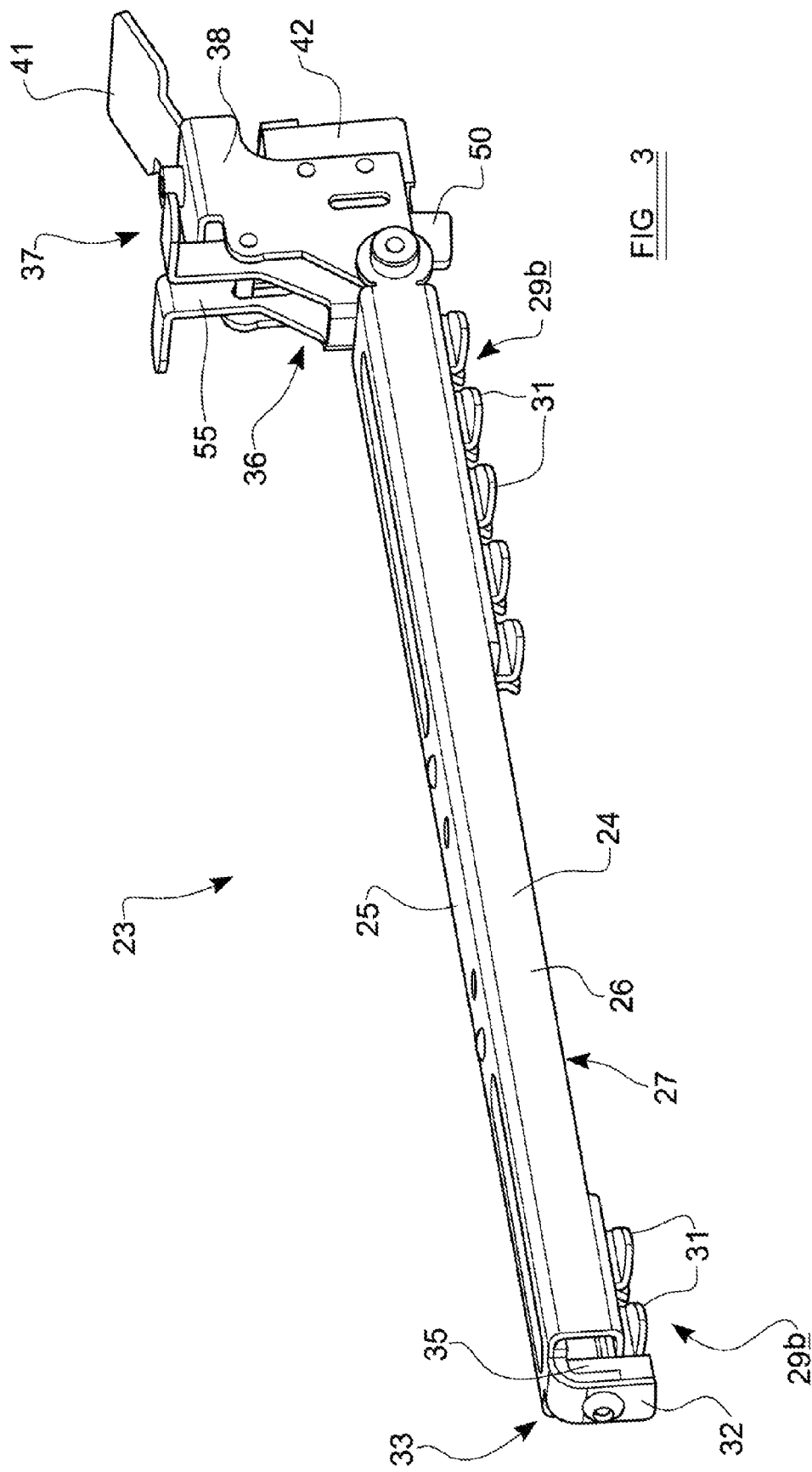
FIG. 3 shows a seat support embodying the present invention.

A seat support 23 is shown in FIG. 3. The seat support 23 is generally elongate, and comprises a robust, elongate main body 24, which can function as the main structural element of the seat support 23. In the embodiment shown in FIG. 3, the main body 24 takes the form of a sturdy, hollow beam with a generally rectangular cross-section. The main body 24 has a top wall 25, opposing side walls 26 and a bottom wall 27. The bottom wall 27 preferably has a slot 28 running along its length.

An interface portion 29 is secured to, or formed integrally with, the underside of the main body 24. The interface portion 29 comprises, as can be seen in FIG. 10 (which shows a head-on view of a cross-section through the interface portion 29), a spacing portion 30 which protrudes downwardly from the bottom wall 27 of the main body 24 by a short distance, and a series of spaced-apart protrusions 31 which extend outwardly from the bottom of the spacing portion 30, generally parallel with the bottom wall 27. The shape and spacing of the protrusions 31 preferably corresponds exactly or approximately to the shape and spacing of the recesses 19 formed in the lips 16, 17 of the track 11. In the embodiment shown, therefore, the protrusions 31 each have a rounded profile.

In the embodiment shown, the support 23 has two interface portions 29, a front interface portion 29a which is provided at or near the front of the main body 24, and a rear interface portion 29b which is provided at or near the rear of the main body 24. In this embodiment the rear interface portion 29b comprises more protrusions 31 than the front interface portion 29a, for reasons which will be discussed below. However, other embodiments may have different arrangements, and may comprise a single interface portion running along the underside of all or some of the main body 24.

The seat support 23 also includes a first bracing portion 32, which is positioned at the front end 33 of the support 23. It is envisaged that the first bracing portion 32 will be fixed with respect to the main body 24, or formed integrally therewith, depending upon the intended application and size of the seat support 23. In FIG. 3, the first bracing portion 32 is integrally formed as part of the main body 24, and is provided at the front end 33 of the main body 24. In the embodiment shown, the upper wall 25 of the main body 24 has a portion 34 which extends forwardly, and is deflected downwardly, around 90° in the example shown, to form the first bracing portion 32. An additional layer of strengthening material 35 may be provided, and in the embodiment of FIG. 3 the strengthening material 35 is bonded to the underside of the first bracing portion 32.

At a rear end 36 of the seat support 23, a locking mechanism 37 is provided.

Figure 6:
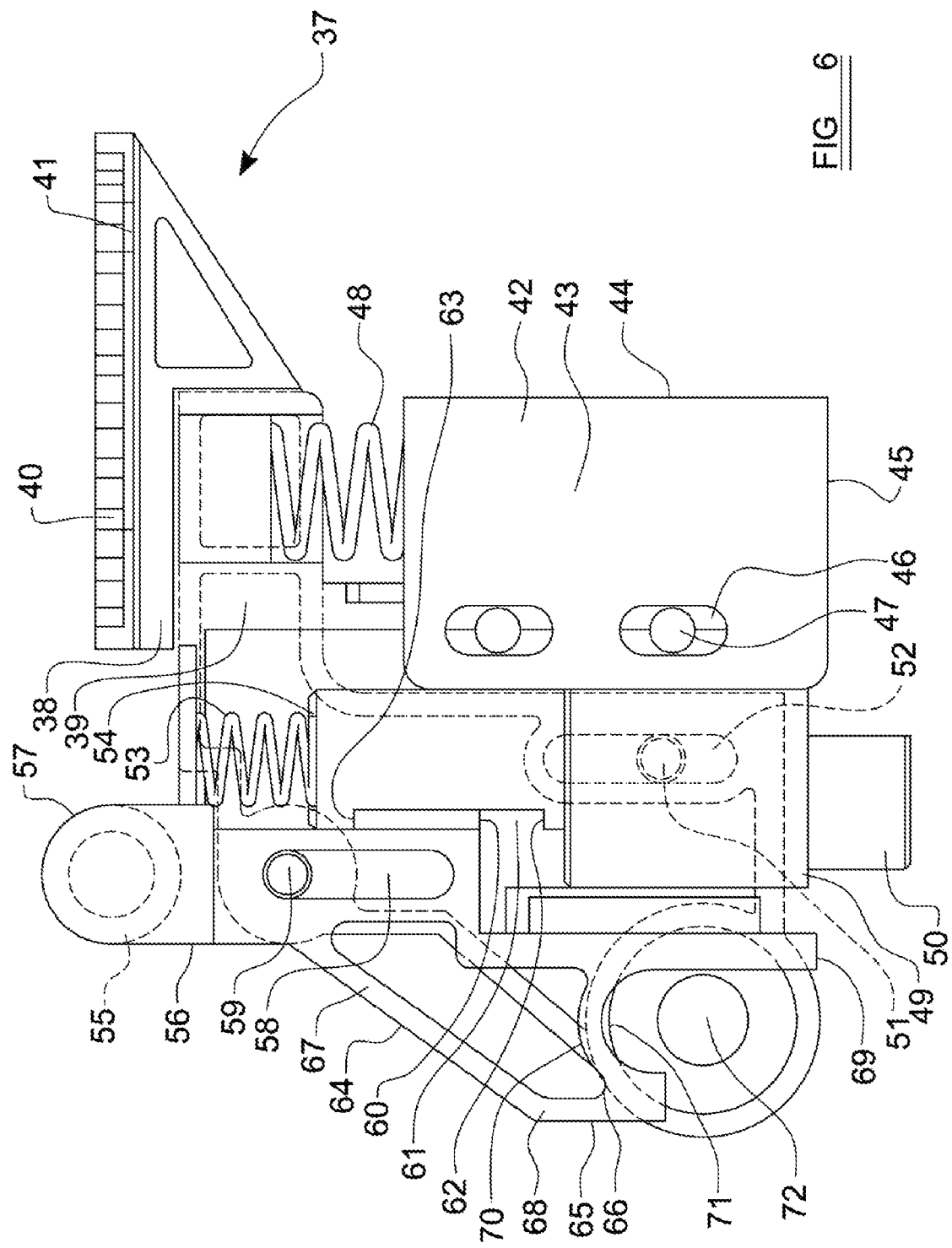
FIG. 6 shows components of a locking mechanism.

A view of the example locking mechanism 37 is shown in FIG. 6. The locking mechanism 37 comprises a main body 38, which takes the form of a sturdy housing made from a robust material such as steel. The main body 38 can be seen in FIG. 3, and it can be seen that the main body 38 substantially encloses several components of the locking mechanism 37. Because the main body 38 also obscures components, the main body 38 is shown in "phantom" in FIG. 6.

The main body 38 includes left and right side walls 39, connected to one another by a top wall 40. The top wall 40 includes a press lever 41, which may be used to operate the locking mechanism 37 (described in more detail below). In the embodiment shown the press lever 41 is provided on the rear side of the top wall 40. The press lever 41 may flare upwardly with respect to the top wall 40. The main body 38 is preferably generally open on its front side (i.e. the side facing in the forward direction of travel) and its back side. It will therefore be understood that the main body 38 generally takes the form of an inverted "U".

Towards its rear side, the locking mechanism 37 includes a clamping body 42. The clamping body 42 has left and right side walls 43, which are connected by a rear wall 44 which may extend over all or substantially all of the height of the side walls 43, or only over a part of this height. The left and right side walls 43 of the clamping body 42 overlap, from a side view, and lie within the side walls 39 of the main body 38. The side walls 43 of the clamping body 42 have lower edges 45 which are generally flat.

The clamping body 42 is not connected to the main body 38, but may move in an upwards/downwards direction with respect to the main body 38, i.e. in a direction generally perpendicular to the plane of the top wall 40 of the main body 38. In the embodiment shown in FIG. 6, each side wall 43 of the clamping body 42 has a pair of slots 46 formed therein. The slots 46 in each side wall 43 are generally aligned with each other, and extend in a direction that is generally perpendicular to the plane of the top wall 40 of the main body 38.

A pair of guide rods 47 extend between, and are fixed with respect to, the side walls 39 of the main body 38. These guide rods 47 each pass through one of the slots 46 in each of the side walls 43 of the clamping body 42. It will be understood that the clamping body 42 may therefore move through a limited distance with respect to the main body 38, and that this distance is determined by the length of the slots 46. However, the clamping body 42 may not be removed from the main body 38.

A first spring 48 extends between the underside of the top wall 40 of the main body 38 and the clamping body 42. The first spring 48 is a compression spring, that biases the clamping body 42 away from the top wall 40 of the main body. In preferred embodiments, when the locking mechanism 37 is in a rest state (i.e. not significantly affected by external forces), the clamping body 42 rests in a position which is as far from the top wall 40 of the main body 38 as the slots 46 and guide rods 47 will allow.

Also contained within the main body 38 is a plunger 49. The plunger 49 generally takes the form of a rod, which is arranged substantially vertically (i.e. substantially perpendicular to the top wall 40 of the main body 38), and carries at its lower end a second bracing portion 50.

The plunger 49 has guide pins 51 protruding from its sides which face the inner sides of the side walls 39 of the main body 38. The guide pins 51 are received in vertically-oriented slots 52 formed in the side walls 39. The plunger 49 can move through a limited distance in a vertical direction with respect to the main body 38, and the distance of travel is determined by the length of the slots 52.

A second spring 53 is positioned between the underside of the top wall 40 of the main body 38 and a top surface 54 of the plunger 49. The second spring 53 is a compression spring, which biases the plunger 49 away from the top wall 40.

The plunger 49 is positioned further forward than the clamping body 42. Although the plunger 49 and clamping body 42 are both movable with respect to the main body 38, they are independently movable and are not connected to one another.

The locking mechanism 37 further comprises a lock element 55, which is positioned near the front of the main body 38. The example lock element 55, as shown in FIG. 6, are parallel, spaced apart plates, each of which takes the same general shape. Only one of the plates can be seen, side-on, in FIG. 6. The lock element 55 comprises a first portion 56, which is arranged generally vertically, and a top part of the first portion 56 protrudes upwardly above the top wall 40 of the main body 38. The top part of the first portion includes handles 57 which can be grasped by a user.

A bottom part of the first portion 56 lies below the level of the top wall 40 of the main body 38, and has an elongate slot 58 formed therethrough. The slot 58 is substantially vertical, i.e. substantially perpendicular to the top wall 40 of the main body 38, and passes through the first portion 56 of the lock element in a direction which is perpendicular to the axis of the main body 24 of the support 23. A pin 59, which extends between the side walls 39 of the main body 38, passes through the slot 58. It will be understood that the lock element 55 can move through a limited distance with respect to the main body 38, with this distance being determined by the length of the slot 58. The lock element is constrained to move in a generally vertical direction, i.e. in a direction which is generally perpendicular to the plane of the top wall 40 of the main body 38 of the locking mechanism 37.

The lock element 55 is positioned adjacent the plunger 49 and, in the example shown, in front of the plunger 49, i.e. further along in the forward direction of travel. A catch 60 extends from the lock element 55 towards the plunger 49, and this catch 60 is received in a corresponding recess 61 formed in a side of the plunger 49 that faces the lock element 55. The recess 61 has upward- and downward-facing shoulders 62, 63. The recess 61 is, in this example, longer than the catch 60 (in the vertical direction), and so the catch 60 can move vertically through a short distance within the recess 61. However, beyond this range of motion, the catch 60 will abut against the upward- or downward-facing shoulder 62, 63 of the recess 61.

A second portion 64 of the lock element 55 protrudes generally downwardly from the first portion 56. A bearing element 65 is generally vertically-oriented, and positioned further forward (i.e. further in the forward direction of travel) than the first portion 56 of the lock element 55. The bearing element 65 has a forward-facing bearing surface 66. A supporting strut 67 connects a top end 68 of the bearing element 65 to the first portion 56.

A rear support 69 extends downwardly from the first portion 56 of the lock element 55, and is oriented generally vertically. The rear support 69 is generally parallel with and spaced apart from the bearing element 65 in a rearward direction. An arching connection 70 is formed extending between the bearing element 65 and the rear support 69. The arching connection 70 forms a downward-facing trough 71, which extends in a direction generally perpendicular to the longitudinal axis of the main body 24 of the support 23.

On the front side of the main body 38, the side walls 39 extend forwardly at their lower edges and have aligned bores 72 passing therethrough. The trough 71 formed by the arching connection 70 is vertically aligned with the bores 72.

The main body 38 of the locking mechanism 37 is pivotally connected to a rear end of the main body 24 of the track 11. The side walls 26 of the main body 24 of the seat support 23 terminates at their rear ends in a pair of rearwardly-extending ears 73, which have bores formed therethrough. To connect the locking mechanism 37 to the support 23, a bolt 74 passes through both the bores 72 formed in the main body 38 and through the bores formed in the rearwardly-extending ears 73 of the support 23. Thus, the rear of the support 23 is pivotally connected to the front of the locking mechanism 37.

Figure 7:
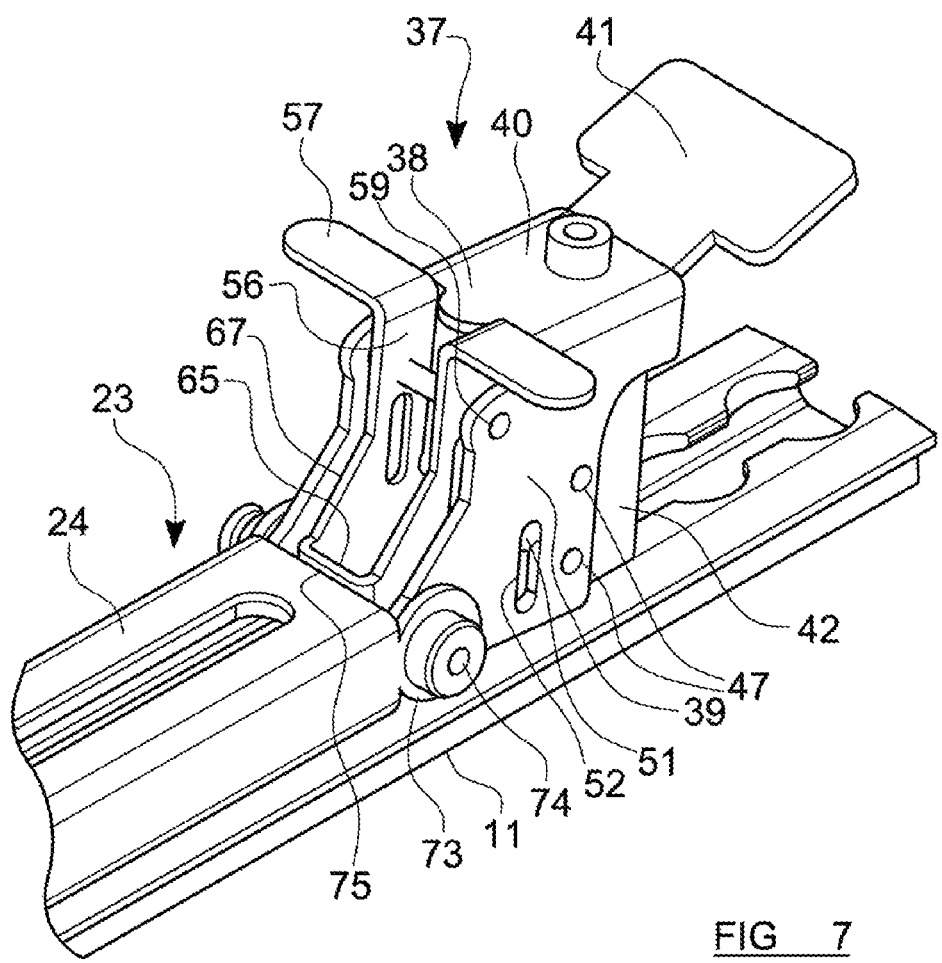
FIG. 7 shows a further view of the locking mechanism.

FIG. 7 shows the locking mechanism 37 attached to the seat support 23. It can be seen that the main body 24 of the support 23 has a rear edge 75, where the top wall 25 and the bottom wall 27 terminate. The rearward-extending ears 73 of the side walls 26 extend rearwardly past this rear edge 75.

Engagement of the seat support 23 with a track 11 will now be described.

In an initial stage, the seat support 23 is placed onto a track 11, of the type shown in FIG. 2, in an engagement position. In this engagement position, the protrusions 31 of the seat support 23 are aligned with the recesses 19 of the track 11. The protrusions 31 of the seat support 23 can therefore pass through the recesses 19 of the track, so that the protrusions 31 of the seat support 23 pass into the channel 15 of the track 11, between the under surface 12 of the track 11 and the undersides of the lips 16, 17.

This engagement position is shown in FIGS. 4 and 5. FIG. 4 shows a side view of the seat support 23 and track 11. FIG. 5 shows a schematic view of the alignment of the protrusions 31 of the seat support 23 and the protrusions 18 and recesses 19 of the track 11, as well as the first bracing portion 32. The first bracing portion 32 lies near the middle of one of the recesses 19 of the track 11, spaced apart from both the forward-facing and rear-facing shoulders 7, 8, with the seat support 23 in the engagement position.

With the seat support 23 in the engagement position, the main body 38 of the locking mechanism 37 is pivoted upwardly away from the track 11 into a raised position, in which a lower edge 76 of the main body 38 is deflected away from being parallel with the main body 24 of the support 23, and lies at an angle thereto. In an example embodiment, the raised position the lower edge 76 of the main body 38 of the locking mechanism 37 can be at an angle of around 30-40° with respect to the main body 24 of the support 23.

When the main body 38 of the locking mechanism 37 is pivoted upwardly into the raised position, the underside of the bearing element 65 rests against the top wall 25 of the main body 24 of the support 23. The second spring 53 presses the plunger 49 and lock element 55 away from the top wall 40 of the main body 38 of the locking mechanism 37, and biases the bearing element 65 against the top wall 25 of the main body 24 of the support 23. In this position, the trough 71 formed by the arching connection 70 is spaced apart from the bores 72 formed through the main body, as is shown in FIG. 6.

When the seat support 23 is placed on the track 11 in the engagement position, and the main body 38 of the locking arrangement 37 is in the raised position, the second bracing portion 50 is raised above the level of the upper surface 13 of the track 11.

Figure 8:
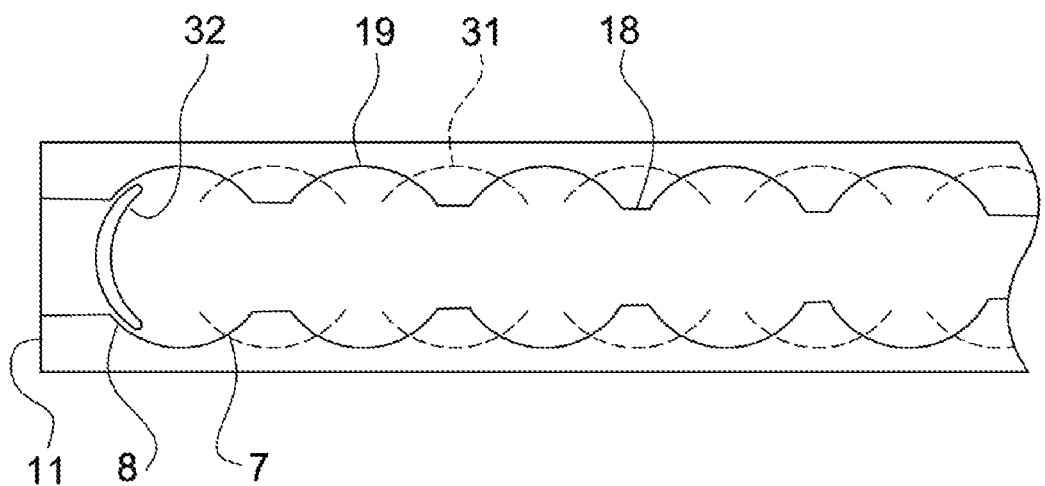

The seat support 23 is then slid forwardly with respect to the track 11, so that the first bracing portion 32 abuts against a pair of rearward-facing shoulders 8. This is shown schematically in FIG. 8. As in FIG. 5, the positions of the protrusions 31 of the support 23 are shown in dashed lines, and it can be seen that the protrusions 31 now align with or overlap with the protrusions 18 of the track 11. It will therefore be understood that, in this position, the seat support 23 cannot be separated from the track 11 by lifting the seat support 23 directly upwardly and away from the track 11. This is the engagement position of the seat support 23 with respect to the track 11.

The user then presses downwardly on the press lever 41, which rotates the main body 38 of the locking mechanism 37 downwardly around the bolt 74. As this happens, the lower edges 45 of the side walls 43 of the clamping body 42 come into contact with the upper surface 13 of the track 11, one on either side of the central slot 14 formed in the track 11. As this occurs, the first spring 48 will be compressed, as the clamping body 42 is pushed towards the top wall 40 of the main body 38.

As the user presses further on the press lever 41, the main body 38 of the locking mechanism rotates further, and also the first spring 48 is compressed further. As this occurs, the bearing element 65 slides along the top wall 25 of the main body 24 of the support 23, towards the rear edge 75 thereof. When the main body 38 has been rotated so that the lower edge 76 thereof is substantially parallel with the main body 24 of the support 23, the bearing element 65 moves into a position where it no longer presses against the top wall 25 of the main body 24 of the support 23. That is, the bearing element 65 slides off the rear edge 75 of the main body 24 of the support 23. At this point, the second spring 53 may drive the plunger 49 downwardly to the furthest point of its range of motion.

The second bracing portion 50, which is positioned on the lower end of the plunger 49, is driven downwardly into the track 11. The spacing between the first and second bracing portions 32, 50 is such that, with the first bracing portion 32 in the engaged position shown in FIG. 8, braced against a pair of rearward-facing shoulders 8, when the main body 38 of the locking mechanism 37 is pivoted downwardly, the second bracing portion 50 is also braced against a, different, pair of rearward-facing shoulders 8. It will be understood that the spacing between the edges of the first and second bracing portions 32, 50 that engage respective rearward-facing shoulders 8 is (when the main body 38 of the locking mechanism 37 is pivoted downwardly, and when the plunger 49 is driven downwardly, as described above) equal or substantially equal to a multiple of the "pitch," the spacing, between adjacent apertures 19, i.e. the spacing distance, of the track 11.

As the second spring 53 drives the plunger 49 downwards, this drives the second bracing portion 51 into one of the apertures 19 in the track 11, so that the second bracing portion 50 bears against a pair of rearward-facing shoulders 8 in the track.

As the second spring 53 drives the plunger 49 downwards, the downward-facing shoulder 63 in the recess 61 of the plunger engages the catch 60 of the lock element 55, and the lock element 55 is also driven downwardly. As this occurs, the bearing element 65 of the lock element 55 is driven into a position in which its forward-facing bearing surface 66 bears against the rear edge 75 of the main body 24 of the support 23. The trough 70 also comes to rest against the bolt 74 about which the locking mechanism 37 pivots with respect to the main body 24 of the support 23.

At this stage, the seat support 23 is in the position shown in FIG. 9. The first and second bracing elements 32, 50 each bear against a pair of rearward-facing shoulders 8 in the track 11. This robustly prevents the seat support 23 from moving forwardly with respect to the track 11.

The clamping body 42 is driven firmly against the top surface 13 of the track 11, by the action of the first spring 48. This tends to lift the locking mechanism 37 upwardly with respect to the track 11. As it does so, it also lifts upwardly the main body 24 of the support 23, and pulls the protrusions 31 of the support 23 into firm engagement with the undersides 22 of the lips 16, 17 of the track. The reader will therefore understand that the lips 16, 17 of the track 11 are effectively clamped between the protrusions 31 of the support 23 (on their undersides 22) and the lower edges 45 of the side walls 43 of the clamping body 42 (on their top sides 13). This clamping action is driven by the first spring 48. The clamping action holds the seat support 23 firmly in place with respect to the track 11, reducing or eliminating any movement, vibration or "play" between the seat support 23 and the track 11. The clamping action will also strongly resist any rearward motion of the seat support 23 with respect to the track 11.

When in this position, the main body 38 of the locking mechanism 37 cannot rotate upwardly, because the bearing element 65 of the lock element 55 abuts against the rear edge 75 of the main body 24 of the support 23. The lock element 55 is held in place by the action of the second spring 53, and so it will not be dislodged by jolting or vibration. The lock element 55, and in particular the bearing element 65 thereof, therefore act as a catch to retain the locking mechanism 37 in a locked configuration.

It will therefore be understood that, in this locked configuration, the seat support 23 is held firmly in place with respect to the track 11, and will strongly resist forward, rearward or upward (i.e. lifting) movement of any kind with respect to the track 11.

In order to remove the seat support 23 from the track 11, the user may grasp the handle 57 on the upper portion 56 of the lock element 55, and lift the lock element 55 upwardly. This will lift up the bearing element 65 above the level of the top wall 25 of the main body 24 of the seat support 23 (and will also withdraw the second bearing element 50 from the track 11). The main body 38 of the locking element can then be rotated upwardly away from the track 11, until it is once more in the raised position. The seat support 23 may then be moved rearwardly with respect to the track 11, until it is in the engagement position, shown in FIGS. 4 and 5. The seat support 23 may then simply be lifted upwardly away from the track 11.

In alternative embodiments, the seat support may have first and second bracing elements which are fixed in place with respect to the main body of the support, and a clamping arrangement which clamps the seat support against the track without involving any movement of either of the bracing elements. For instance, the locking mechanism of the embodiment shown in the figures could omit the plunger 49, but still include the clamping body 42, biased by the first spring 48, and the lock element 55, biased by the second spring 53. However, the second bracing element could simply be an element which is fixed to the main body of the support. To install the support, the support could be placed on the track so that both support elements are received in respective apertures 19 of the track 11, and the support may then be slid forward until both bracing elements bear against respective rearward-facing shoulders 8 of the track 11. The locking mechanism may then be activated to clamp the support to the track 11, with the clamping body 42 pressing downward on the upper surface 13 of the track 11, and the bearing element 65 of the lock element 55 abutting against the rear edge 75 of the main body and thus preventing the main body of the locking arrangement from pivoting upwardly.

Any other kind of clamping or locking mechanism may be used to secure the seat support to the track, and the invention is not limited to the mechanisms described above. In general, it is preferred that one or more of the lips 16, 17 of the track 11 are gripped between two elements, so that one element presses against the top side of the lip(s) and another element presses against the bottom side of the lip(s).

The embodiments described above provide simple and robust arrangements for securing a support to a track. In particular, even if used by an unfamiliar operator, a seat support embodying the invention will have a high level of safety and a low failure rate in the event of a head-on collision.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A seat support for use with a vehicle seat and adapted to engage a track provided on the floor of a vehicle, the track comprising two inwardly-directed lips on opposed sides of a slot, the lips providing first alternating protrusions and recesses along the length of the track, the protrusions being spaced apart by a spacing distance, the first protrusions defining shoulder surfaces on each side thereof, the seat support having an elongate main body and comprising:
    an interface portion having a profile comprising second alternating protrusions and second spaces, the protrusions being spaced apart by the second spaces having the same spacing distance;
    first and second bracing members; and
    a locking arrangement, wherein:

the seat support is configured such that the second protrusions may be aligned with the first recesses so that the interface portion may be placed within the slot in an engagement position, the seat support being moveable with respect to the slot, from the engagement position into a bracing position in which the first and second protrusions are substantially aligned, preventing the interface portion from being removed from the slot;

the first bracing member is substantially fixed in place with respect to the main body of the seat support, so that in both the engagement position and the bracing position the first bracing member is received in one of the recesses of the track;

the locking arrangement is movable between a release configuration and a locking configuration, wherein in the release configuration the locking arrangement allows longitudinal movement of the seat support with respect to the track, and in the locking configuration the locking arrangement exerts a clamping force on a part of the track, to lock the seat support in place longitudinally with respect to the track; and when the seat support is in the engagement position and the locking arrangement is in the locking configuration, the first and second bracing members are received in respective recesses of the track and are braced against respective first and second pairs of shoulders on the track, wherein the first and second pairs of shoulders face in substantially the same direction.

2. The seat support according to claim 1 wherein:
the track defines a first longitudinal direction and a second substantially opposite longitudinal direction;
the first and second pairs of shoulders face in the second direction; and
in the bracing position, the bracing of the first and second bracing members against the first and second pairs of shoulders prevents longitudinal movement of the seat support with respect to the track in the first direction.

3. The seat support according to claim 1, wherein the locking arrangement comprises a first clamping member which, in the locking configuration, is biased against an upper surface of the track.

4. The seat support according to claim 3, further comprising an operating member which a user may operate to drive the first clamping member against the upper surface of the track, and preferably wherein the operating member is a lever which is pivotable with respect to the main body.

5. The seat support according to claim 1 wherein, when the locking arrangement is in the locking configuration, at least one protrusion of the interface portion is pressed against the underside of at least one of the lips of the track.

6. The seat support according to claim 1, further comprising a catch arrangement to retain the locking arrangement in the locking configuration.

7. The seat support according to claim 6, wherein the catch arrangement comprises a catch element which, in a retaining position, bears against a further part of the seat support to prevent the locking arrangement from moving from the locking configuration to the release configuration.

8. The seat support according to claim 7 wherein, when the locking arrangement is moved from the release configuration to the locking configuration, the catch member moves automatically into the retaining position.

9. The seat support according to claim 7, comprising a handle configured to be grasped by a user to move the catch element out of the retaining position and cause the locking arrangement to be moved from the locking configuration to the release configuration.

10. The seat support according to claim 7, wherein the second bracing member is movable between an extended position and a retracted position, and wherein the catch element is connected to, or moves together with, the second bracing member, and wherein, when the catch member is in the retaining position, the second bracing member is in the extended position.

11. The seat support according to claim 1, wherein the second bracing member is provided on, or carried by, part of the locking arrangement.

12. The seat support according to claim 1, wherein the second bracing member is movable between an extended position and a retracted position.

13. The seat support according to claim 1, wherein the first and/or second bracing members comprise a surface against which the respective first and/or second pair of shoulders are configured to bear.

14. The seat support according to claim 1, wherein the second bracing member is fixed in place with respect to the main body of the seat support.

15. The seat support according claim 1, wherein, when the seat support is placed on the track in the engagement position and then moved longitudinally with respect to the track, the first bracing portion contacts a pair of shoulders of the track and acts as a stop to cause the seat support to be moved to the bracing position.

16. The seat support according to claim 1, wherein when the seat support is in the bracing position, the first recesses and second spaces at least partially overlap.

17. The seat support according to claim 16, wherein when the seat support is in the locking position, the first recesses and second spaces are substantially aligned.

18. The seat support according to claim 1, wherein the track configured to be installed in a vehicle which has a normal forward direction of travel, and the track comprises forward-facing shoulders and rearward-facing shoulders, and wherein, in the bracing position, both the first and second bracing elements are braced against respective pairs of rearward-facing shoulders.

19. The seat support according to claim 1, further comprising a track and two inwardly-directed lips on opposed sides of a slot, the lips providing first alternating protrusions and recesses along the length of the track, the protrusions being spaced apart by a spacing distance, the first and second protrusions defining shoulder surfaces on each side thereof.

20. The seat support according to claim 1, further comprising a seat with which the seat support is configured to fit.

* * * * *